(12) United States Patent
Chuang (10) Patent No.: US 12,439,010 B2
(45) Date of Patent: Oct. 7, 2025

(54) ROTATION WHEEL AND PROJECTION APPARATUS

(71) Applicant: Coretronic Corporation, Hsin-Chu (TW)

(72) Inventor: Yao-Chien Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 384 days.

(21) Appl. No.: 17/970,581

(22) Filed: Oct. 21, 2022

(65) Prior Publication Data

US 2023/0126398 A1 Apr. 27, 2023

(30) Foreign Application Priority Data

Oct. 25, 2021 (CN) .......................... 202122563174.7

(51) Int. Cl.
*H04N 9/31* (2006.01)
*G02B 26/00* (2006.01)
(52) U.S. Cl.
CPC ......... *H04N 9/3158* (2013.01); *G02B 26/008* (2013.01); *H04N 9/3197* (2013.01)
(58) Field of Classification Search
USPC .......................................................... 353/84
See application file for complete search history.

(56) References Cited

U.S. PATENT DOCUMENTS

| 2005/0109154 A1* | 5/2005 | Chang | F16F 15/363 |
| | | | 74/573.1 |
| 2006/0126198 A1* | 6/2006 | Niwa | G03B 33/00 |
| | | | 359/885 |
| 2016/0291315 A1* | 10/2016 | Hsu | G03B 21/204 |

FOREIGN PATENT DOCUMENTS

| CN | 207742457 | 8/2018 |
| TW | 201626093 | 7/2016 |
| TW | I598675 | 9/2017 |

* cited by examiner

*Primary Examiner* — Toan Ton
*Assistant Examiner* — Danell L Owens
(74) *Attorney, Agent, or Firm* — JCIPRNET (57) ABSTRACT

A rotation wheel, comprising a substrate, a driving assembly, a clamping member and a balancing assembly. The driving assembly is connected with the substrate, and is configured to drive the substrate to rotate around an axis of the driving assembly as the central axis. The clamping member is disposed along the axis on the substrate. The balancing assembly includes at least one balancing material, an adhesive material and at least one channel. The adhesive material encapsulates the balancing material and is filled into the channel to fix the balancing assembly onto the clamping member. The rotation wheel and the projection apparatus of the invention exhibit favorable structural reliability.

16 Claims, 7 Drawing Sheets

ROTATION WHEEL AND PROJECTION APPARATUS

CROSS-REFERENCE TO RELATED APPLICATION

This application claims the priority benefit of China application serial no. 202122563174.7, filed on Oct. 25, 2021. The entirety of the above-mentioned patent application is hereby incorporated by reference herein and made a part of this specification.

BACKGROUND

Technical Field

The invention relates to a rotation wheel and a projection apparatus, and particularly relates to a rotation wheel having higher structural reliability and being able to rotate smoothly rotation, and a projection apparatus has the rotation wheel.

Description of Related Art

A rotation wheel in a projection apparatus (a projector) is driven by a driving assembly (for example, a motor) to rotate. To reduce the centrifugal force resulting from an imbalanced mass distribution of the rotation wheel relative to the driving assembly, the rotation wheel is dynamically balanced when manufactured, so that the rotation wheel can rotate smoothly. Generally speaking, there are two common methods for dynamic balancing correction, which are to increase and decrease the mass, respectively. Specifically, the correction made by increasing the mass includes adding a balancing member to the rotation wheel to correct the imbalanced mass distribution of the rotation wheel.

Conventionally, four options are provided for the process of adding the extra balancing member to the rotation wheel:

(1) Screwing: the balancing member may be screwed onto the rotation wheel. However, after the rotation wheel rotates for a long time, the screw may become loose and gradually detached due to vibration.

(2) Normal-temperature curing: the balancing member may be encapsulated by a normal-temperature curing adhesive and sits for a period of time so that the normal-temperature curing adhesive becomes set. However, the curing time in this way is too long and the production efficiency of the rotation wheel is affected.

(3) Thermal curing: the balancing member may be encapsulated by a thermal curing adhesive, and the thermal curing adhesive is set through heating by an oven or a heat gun. Although the time required for thermal curing is much shorter than the time required for room-temperature curing, the change of the temperature causes different degrees of influence to the optical layer, the rotation plate and the driving assembly of the rotation wheel, and further affects the structural reliability of the rotation wheel.

(4) Photo-curing: the balancing member is encapsulated by a photo-curing adhesive, and the photo-curing adhesive is irradiated with a light source of a predetermined wavelength to set the photo-curing adhesive. Although the time required for photo-curing is the shortest and the production efficiency of the rotation wheel is favorable, the photo-curing light is limited by adhesive transmittance rate, insufficient time of irradiation or shielding of the balancing member. As a result, the photo-curing adhesive at the bottom of the balancing member is unable to be set, and there is still a chance that the balancing member may fall off when the rotation wheel rotates at a high speed, which affects the overall structural reliability of the rotation wheel.

The information disclosed in this Background section is only for enhancement of understanding of the background of the described technology and therefore it may contain information that does not from the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a rotation wheel having higher structural reliability. In addition, in the rotation wheel, an imbalanced mass distribution is corrected.

The invention further provides a projection apparatus which includes the rotation wheel. With the rotation wheel, the projection apparatus exhibits favorable projection quality and product competitiveness.

The other reasons and advantages of the invention can be further understood from the technical features disclosed by the invention.

To achieve one or partial or all of the foregoing reasons or other reasons, an embodiment of the invention provides a rotation wheel, including a substrate, a driving assembly, a clamping member and a balancing assembly. The driving assembly is connected with the substrate, and is configured to drive the substrate to rotate around an axis of the driving assembly as a central axis. The clamping member is disposed along the axis on the substrate. The balancing assembly includes at least one balancing member, an adhesive material and at least one channel. The adhesive material encapsulates the balancing member and is filled into the channel to fix the balancing assembly onto the clamping member.

In an embodiment of the invention, the balancing member is one balancing member, and the channel is a plurality of through holes penetrating the balancing member and separated from each other.

In an embodiment of the invention, the balancing member is one balancing member, and the channel is a slot penetrating the one balancing member.

In an embodiment of the invention, the balancing member is a plurality of balancing members, and the channel includes plural gaps which are respectively located between the balancing members.

In an embodiment of the invention, the channel further comprises plural through holes which penetrate the balancing members respectively.

In an embodiment of the invention, the balancing member is connected with a configuration surface of the clamping member by the adhesive material.

In an embodiment of the invention, a shape of the balancing member includes a ring-shaped column, a cylindrical column, a sphere or a polygonal column.

In an embodiment of the invention, a density of the balancing member is greater than 2 $g/cm^3$ and less than 23 $g/cm^3$.

In an embodiment of the invention, the density of the above balancing member is greater than a density of the substrate.

In an embodiment of the invention, the density of the balancing member is higher than a density of the clamping member.

In the embodiment of the invention, the rotation wheel further includes an optical layer disposed on the substrate and located on a same side of the substrate with the clamping member.

In an embodiment of the invention, a shape of the substrate and the clamping member are a hollow ring respectively. The substrate and the clamping member are respectively disposed to be coaxial with the driving assembly.

To achieve one or partial or all of the foregoing reasons or other reasons, an embodiment of the invention provides a projection apparatus. The projection apparatus includes an illumination module, a light valve and a projection lens. The illumination module includes a light source device and a rotation wheel. The illumination module is adapted to provide an illumination light beam. The rotation wheel is disposed on a transmission path of an excitation light beam provided by the light source device. The rotation wheel includes a substrate, a driving assembly, a clamping member and a balancing assembly. The driving assembly is connected with the substrate, and is configured to drive the substrate to rotate around an axis of the driving assembly as a central axis. The clamping member is disposed along the axis on the substrate. The balancing assembly includes at least one balancing member, a adhesive material and at least one channel. The adhesive material encapsulates the balancing member and is filled into the channel to fix the balancing assembly onto the clamping member. The light valve is disposed on a transmission path of the illumination light beam from the rotation wheel and is configured to convert the illumination light beam into an image light beam. The projection lens is disposed on a transmission path of the image light beam and projects the image light beam out the projection apparatus.

Based on the above, the embodiments of the invention have at least one of the following advantages or effects. In the rotation wheel of the invention, the balancing assembly includes the balancing member, the adhesive material and the channel. The adhesive material encapsulates the balancing member and is filled into the channel to fix the balancing assembly onto the clamping member. With the design of the channel, the contact areas between the adhesive material and the balancing member as well as the clamping member and the adhesion after encapsulating can be increased, thereby strengthening the structural reliability of the rotation wheel of the invention. In addition, the projection apparatus using the rotation wheel of the invention exhibits favorable projection quality and product competitiveness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
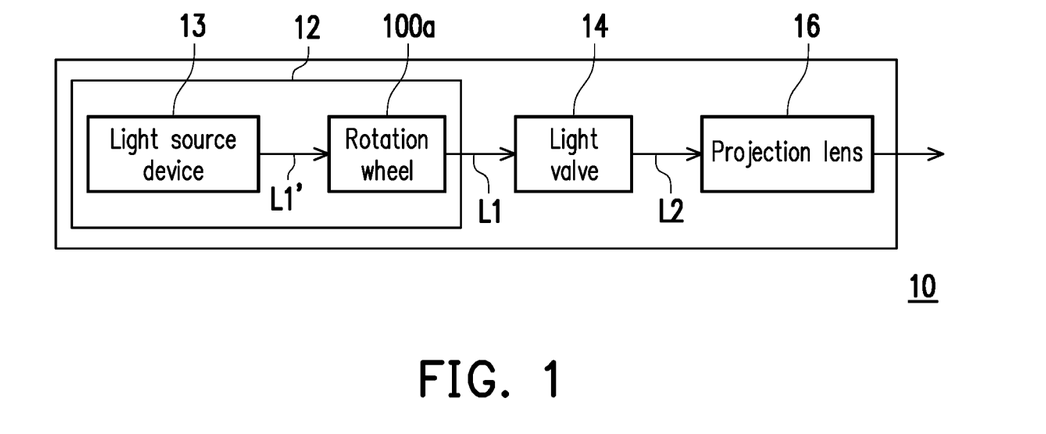
FIG. 1 is a schematic view of a projection apparatus according to an embodiment of the invention.

FIG. 1 is a schematic view of a projection apparatus according to an embodiment of the invention. Referring to FIG. 1, in the embodiment, a projection apparatus 10 includes an illumination module 12, a light valve 14 and a projection lens 16. The illumination module 12 includes a light source device 13 and a rotation wheel 100a. The illumination module 12 is adapted to provide an illumination light beam L1. The rotation wheel 100a is disposed on a transmission path of an excitation light beam L1' provided by the light source device 13. The rotation wheel 100a may be, for instance, a phosphor wheel, a filtering color wheel or a diffusing wheel, and the rotation wheel 100a enters the transmission path of the excitation light beam L1' in a temporal manner to generate the illumination light beam L1. The light valve 14 is disposed on the transmission path of the illumination light beam L1 from the rotation wheel 100a to convert the illumination light beam L1 into an image light beam L2. The projection lens 16 is disposed on the transmission path of the image light beam L2 to project the image light beam L2 out the projection apparatus 10.

Furthermore, the light source device 13 adopted in the embodiment, for instance, is a laser diode (LD), such as a laser diode bank, or a light emitting diode (LED). Specifically, a light source complying with the volume requirement may be adopted in practical designs, and the embodiment is not limited thereto. The light valve 14 is a reflective light modulator like, for example, a liquid crystal on silicon panel (LCoS panel), a digital micro-mirror device (DMD), etc. In an embodiment, the light valve 14 is a transmissive light modulator like, for example, a transparent liquid crystal panel, an electro-optical modulator, a maganeto-optic modulator, an acousto-optic modulator (AOM), etc., but the embodiment is not particularly limited by the configuration and the type of the light valve 14. The detailed steps and examples for converting the illumination light beam L1 into the image light beam L2 through the light valve 14 have been taught, recommended and explained in the common knowledge of the related field, so no more details in these regards are to be provided. In addition, the projection lens 16, for instance, includes a combination of one or more optical lens elements with refractive power. For example, the one or more optical lens elements may include various combinations of a biconcave lens element, a biconvex lens element, a concave-convex lens element, a convex-concave lens element, a plane-convex lens element and a plane-concave lens element. In an embodiment, the projection lens 16 can also include a plane optical lens element for projecting the image light beam 12 from the light valve 14 out of the projection apparatus 10 through reflection or transmittance. Here, the embodiment is not particularly limited by the configuration and the type of the projection lens 16.

Figure 2A:
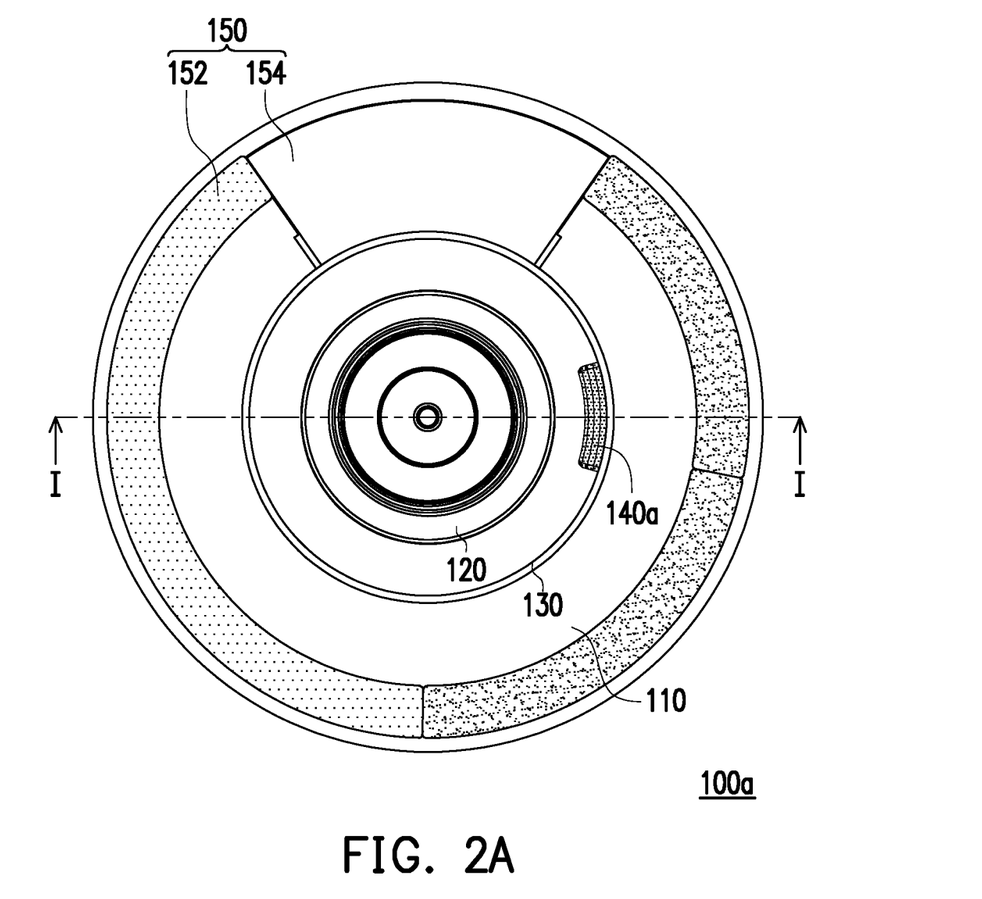
FIG. 2A is a schematic top view of a rotation wheel of the projection apparatus in FIG. 1.
Figure 2B:
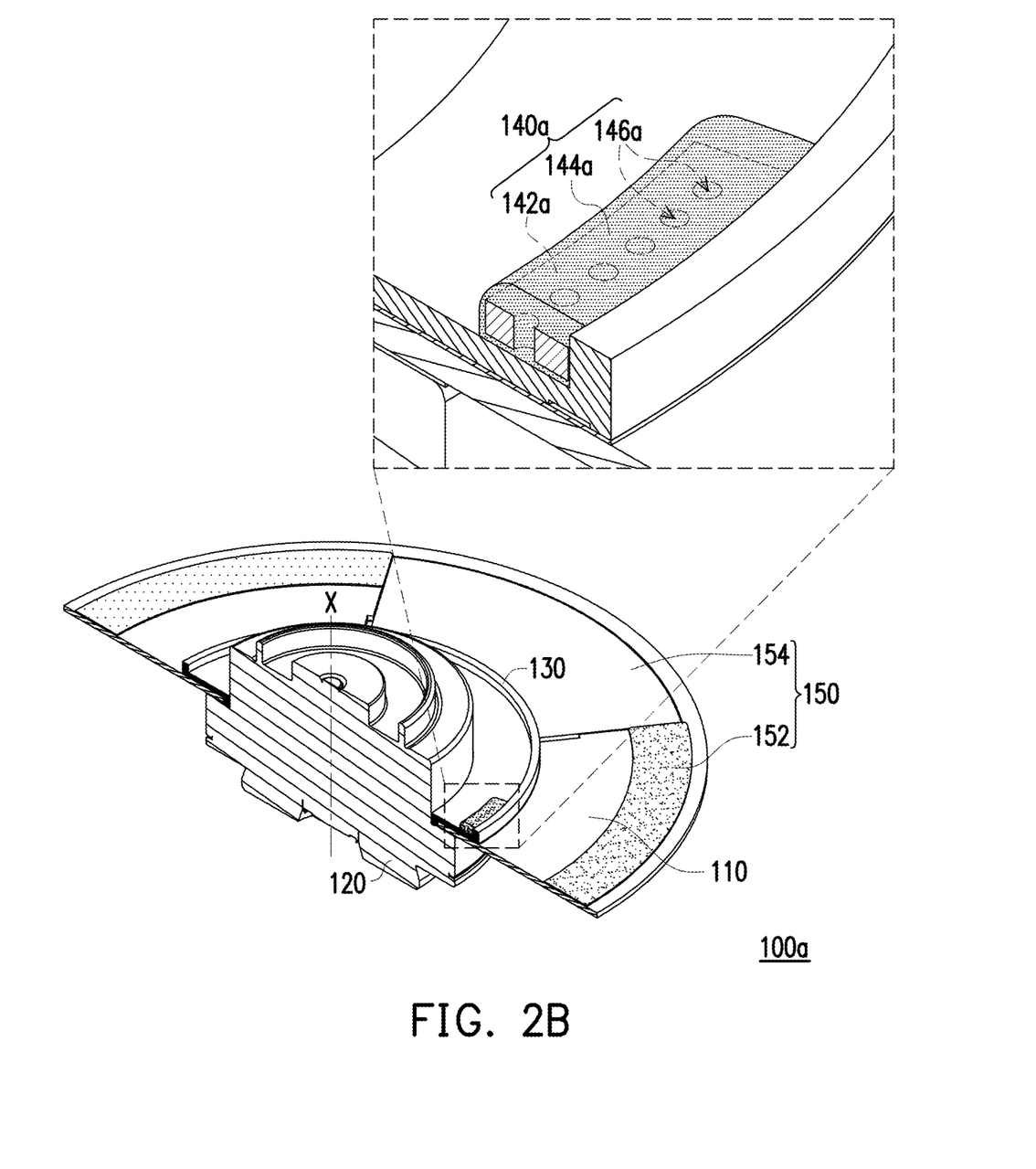
FIG. 2B is a schematic perspective cross-sectional view taken along line I-I of FIG. 2A.
Figure 2C:
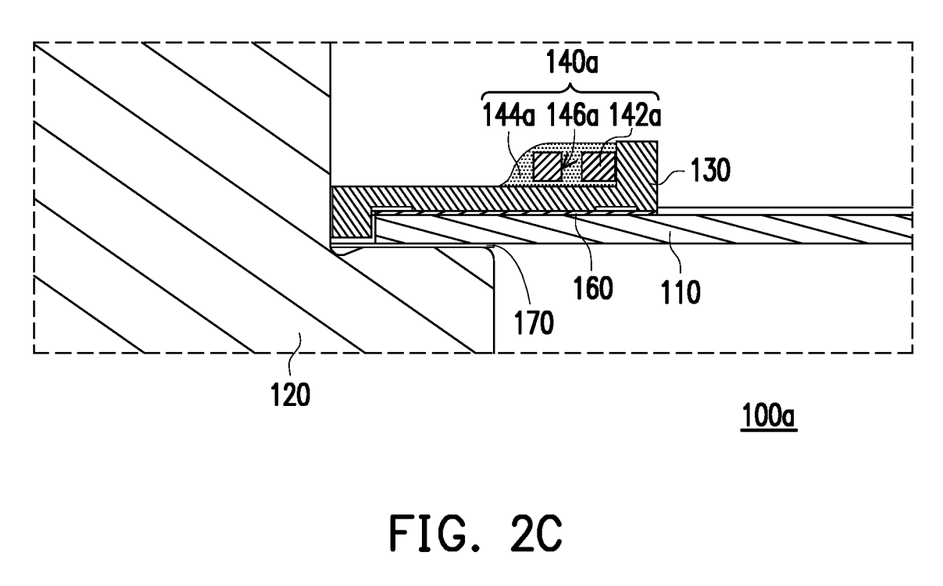
FIG. 2C is a schematic cross-sectional view of the rotation wheel of FIG. 2B.

FIG. 2A is a schematic top view of the rotation wheel of the projection apparatus in FIG. 1. FIG. 2B is a schematic perspective cross-sectional view taken along a line I-I of FIG. 2A. FIG. 2C is a schematic cross-sectional view of the rotation wheel of FIG. 2B. Referring to FIG. 2A, FIG. 2B and FIG. 2C together, the rotation wheel 100a of the embodiment includes a substrate 110, a driving assembly 120, a clamping member 130 and a balancing assembly 140a. The driving assembly 120 is connected with the substrate 110, and is configured to drive the substrate 110 to rotate around an axis X of the driving assembly 120 as a central axis. The clamping member 130 is disposed along the axis X on the substrate 110. The balancing assembly 140a includes a balancing member 142a, an adhesive material 144a and plural channels 146a. The adhesive material 144a encapsulates the balancing member 142a and is filled into the channels 146a to fix the balancing assembly 140a onto the clamping member 130 by exploiting the adhesiveness of the adhesive material 144.

Specifically, in the embodiment, the substrate 110 is, for example, a phosphor wheel substrate, a filtering color wheel substrate and a diffusing wheel substrate. The shapes of the substrate 110 and the clamping member 130 are hollow ring-shaped respectively, and the substrate 110 and the clamping member 130 are disposed to be coaxial with the driving assembly 120 respectively. Here, the material of the clamping member 130 is, for instance, a metal, a plastic, or a ceramic material. Particularly, in the embodiment, the channels 146a of the balancing assembly 140a are embodied as plural through holes penetrating the balancing member 142a and separated from each other. When the rotation wheel 100a is viewed from a top perspective, the through holes are in a shape of circular holes for instance, but the invention is not limited by the shape of the through holes. As shown in FIG. 2C, the balancing member 142a does not directly contact the clamping member 130, but is connected with a configuration surface of the clamping member 130 by the adhesive material 144a. In other words, with the design of the channels 146a, a greater contact area is provided between the balancing member 142a and the adhesive material 144a of the embodiment, and the adhesion after encapsulation can be increased, thereby strengthening the overall structural reliability of the rotation wheel 100a.

Further specifically, referring to FIG. 2B and FIG. 2C, the balancing member 142a of the embodiment is embodied in the shape of a polygonal column, like a rectangular column. The density of the balancing member 142a is greater than 2 $g/cm^3$ and less than 23 $g/cm^3$. The density of the balancing member 142a may be greater than the density of the substrate 110, and the density of the balancing member 142a may be greater than the density of the clamping member 130. Here, the balancing member 142a is formed by stamping, and the material of the balancing member is, for example, a metal, a non-mental and a complex material. The material of the substrate 110 is, for example, an aluminum alloy, a metal oxide or a silicon carbide. The adhesive material 144a is, for example, a light transmissive adhesive, and the light transmissive adhesive may be, for instance, an UV curable adhesive.

Referring to FIG. 2A and FIG. 2B, in the embodiment, the rotation wheel 100a further includes an optical layer 150. The optical layer 150 is disposed on the substrate 110 and located on the same side of the substrate 110 with the clamping member 130. Here, an example in which the substrate 110 is embodied as a phosphor wheel substrate is described. The optical layer 150 includes a wavelength conversion layer 152 and a light transmissive plate 154, the wavelength conversion layer 152 is disposed on the substrate 110, and the light transmissive plate 154 and the substrate 110 define a hollow ring shape. Besides, referring to FIG. 2C as well, the rotation wheel 100a further includes a first adhesive layer 160 and a second adhesive layer 170. The first adhesive layer 160 is disposed between the substrate 110 and a clamping assembly 130, the clamping assembly 130 is fixed on the substrate 110 through the first adhesive layer 160. The second adhesive layer 170 is disposed between the substrate 110 and the driving assembly 120, and the driving assembly 120 is fixed on the substrate 110 through the second adhesive layer 170.

With the design of the channels 146a of the balancing assembly 140a of the embodiment, a curing light beam can be directly irradiated to the bottom of the balancing member 142a. In this way, the adhesive material 144a at the bottom of the balancing member 142a can be easily cured by irradiation while increasing the contact area between the adhesive material 144a and the balancing member 142a. Thus, the balancing member 142a is closely attached to the clamping member 130. In brief, with the design of the channels 146a, the contact areas between the adhesive material 144a, the balancing member 142a as well as the clamping member 130 and the adhesion after encapsulation can be increased, thus strengthening the structural reliability of the rotation wheel 100a of the embodiment. Besides, the projection apparatus 10 using the rotation wheel 100a of the embodiment exhibits favorable projection quality and product competitiveness.

In the following embodiment, the reference symbols and a portion of the contents of the foregoing embodiment will still be used. In addition, like reference symbols are adopted to represent like or similar components, and the descriptions of the repeated technical contents are omitted. The descriptions of the omitted part can be found in the foregoing embodiment and will not be repeated again in the following.

Figure 3A:
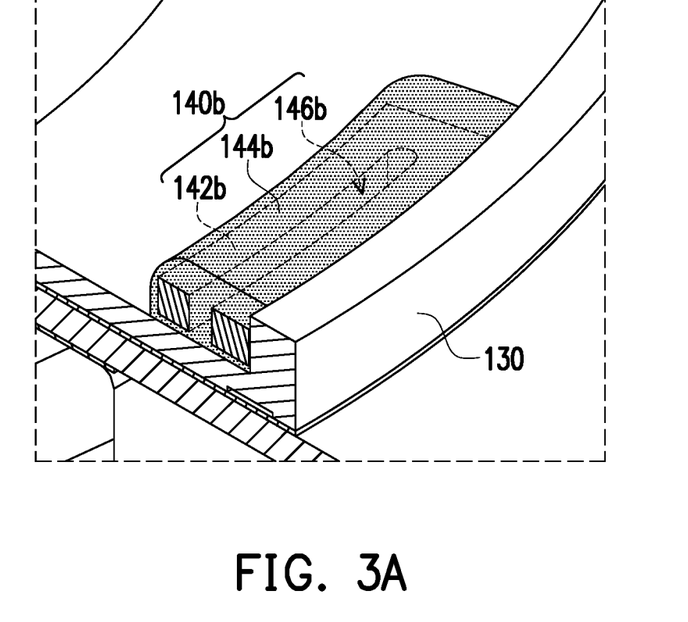
FIG. 3A is a schematic perspective cross-sectional view of a rotation wheel according to an embodiment of the invention.
Figure 3B:
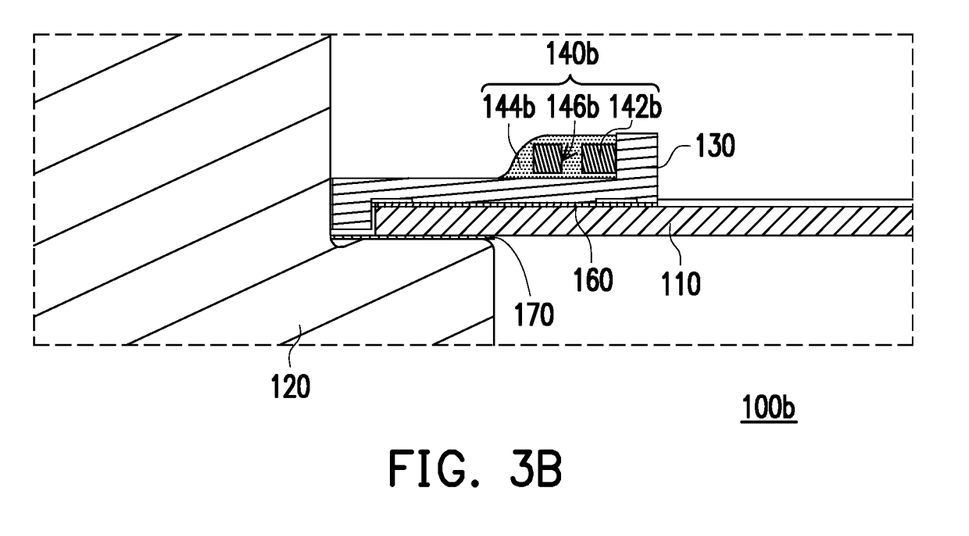
FIG. 3B is a schematic cross-sectional view of a rotation wheel of FIG. 3A.

FIG. 3A is a schematic perspective cross-sectional view of a rotation wheel according to an embodiment of the invention. FIG. 3B is a schematic cross-sectional view of the rotation wheel of FIG. 3A. Referring to FIG. 2B, FIG. 3A and FIG. 3B together, a rotation wheel 100b of the embodiment is similar to the rotation wheel 100a of FIG. 2B, and a difference mainly lies in: in the embodiment, a balancing assembly 140b includes a balancing member 142b, an adhesive material 144b and a channel 146b. The adhesive material 144b encapsulates the balancing member 142b and is filled into the channel 146b to fix the balancing assembly 140b onto the clamping member 130. Here, the shape of the balancing member 142b is, for instance, a ring-shaped column and the channel 146b is embodied as a slot penetrating the balancing member 142b.

With the design of the channel 146b in the balancing assembly 140b, a curing light beam can be directly irradiated to the bottom of the balancing member 142b. In this way, the adhesive material 144b at the bottom of the balancing member 142b can be easily cured by irradiation while increasing the contact area between the adhesive material 144b and the balancing member 142b. Thus, the balancing member 142b is closely attached to the clamping member 130. In brief, with the design of the channel 146b, the contact areas between the adhesive material 144b, the balancing member 142b as well as the clamping member 130 and the adhesion after encapsulation can be increased, thereby strengthening the structural reliability of the rotation wheel 100b of the embodiment.

Figure 4A:
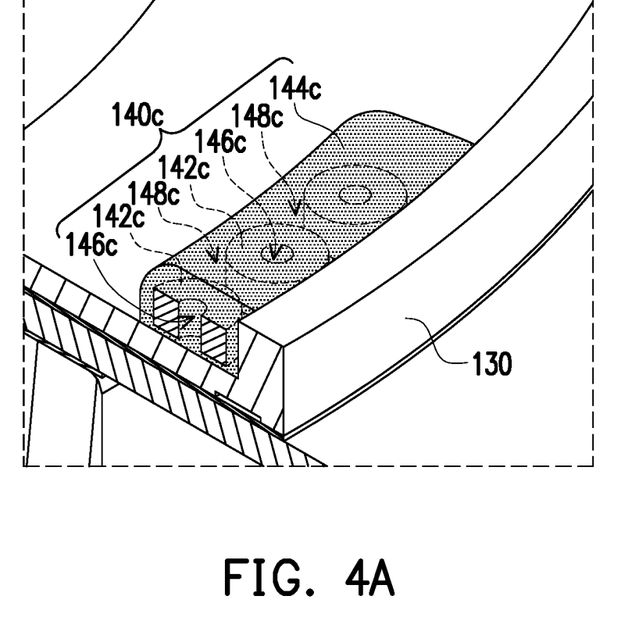
FIG. 4A is a schematic cross-sectional perspective view of a rotation wheel according to another embodiment of the invention.
Figure 4B:
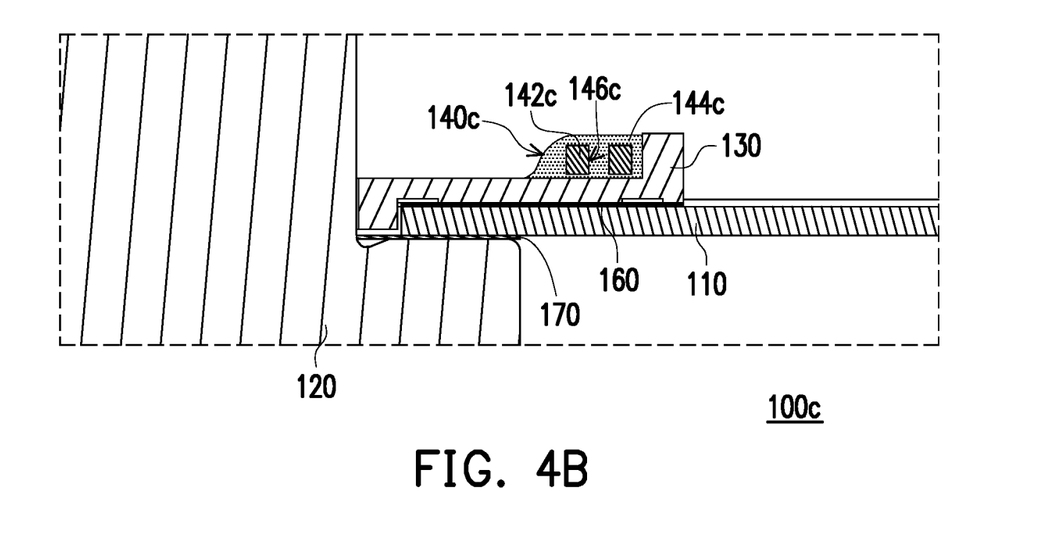
FIG. 4B is a schematic cross-sectional view of the rotation wheel of FIG. 4A.

FIG. 4A is a schematic perspective cross-sectional view of a rotation wheel according to another embodiment of the invention. FIG. 4B is a schematic cross-sectional view of the rotation wheel of FIG. 4A. Referring to FIG. 2B, FIG. 4A and FIG. 4B together, a rotation wheel 100c of the embodiment is similar to the rotation wheel 100a of FIG. 2B, and a difference mainly lies in: in the embodiment, a balancing assembly 140c includes plural balancing members 142c, a adhesive material 144c and plural channels 146c, 148c. The adhesive material 144c encapsulates the balancing members 142c separated from each other and is filled into the channels 146c, 148c to fix the balancing assembly 140c onto the clamping member 130. Here, the shape of the balancing member 142c is, for instance, a cylindrical column and the channels 146c are embodied as plural through holes penetrating the balancing members 142c. When the rotation wheel 100c is viewed from the top, the shape of the through hole is a circular. Besides, the channels 148c of the embodiment are embodied as plural gaps. The gaps are respectively located between the balancing members 142c.

Since the balancing assembly 140c of the embodiment is designed with the channels 146c, 148c, a curing light beam can be directly irradiated to the bottom of the balancing members 142c. In this way, the adhesive material 144c at the bottom of the balancing member 142c can be easily cured by irradiation while increasing the contact area between the adhesive material 144c and the balancing members 142c. Thus, the balancing members 142c is closely attached to the clamping member 130. In brief, with the design of the channels 146c, 148c, the contact areas between the adhesive material 144c, the balancing members 142c as well as the clamping member 130 and the adhesion after encapsulation can be increased, thus strengthening the structural reliability of the rotation wheel 100c of the embodiment.

Figure 5A:
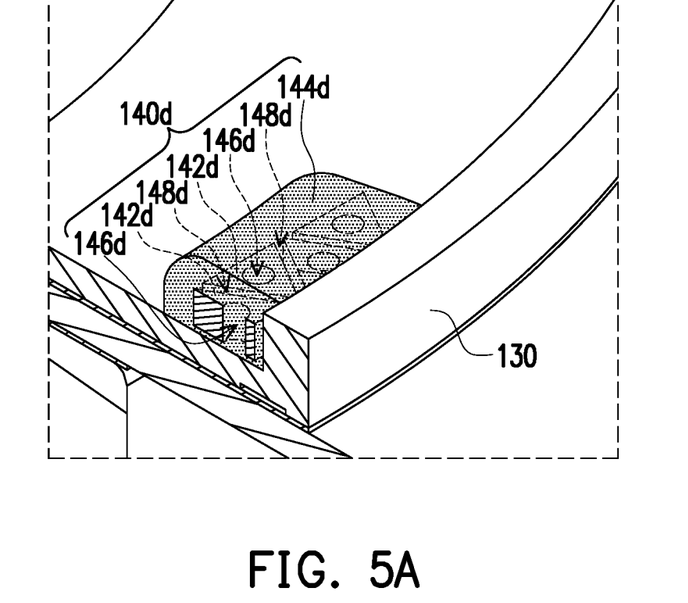
FIG. 5A is a schematic cross-sectional perspective view of a rotation wheel according to another embodiment of the invention.
Figure 5B:
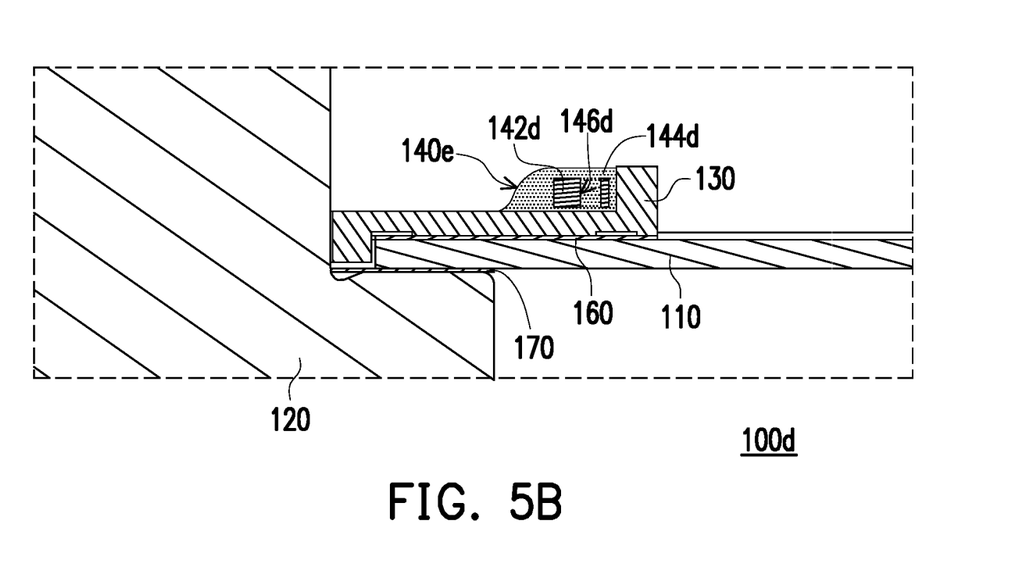
FIG. 5B is a schematic cross-sectional view of the rotation wheel of FIG. 5A.

FIG. 5A is a schematic perspective cross-sectional view of a rotation wheel according to another embodiment of the invention. FIG. 5B is a schematic cross-sectional view of the rotation wheel of FIG. 5A. Referring to FIG. 2B, FIG. 5A and FIG. 5B together, a rotation wheel 100d of the embodiment is similar to the rotation wheel 100a of FIG. 2B, and a difference mainly lies in: in the embodiment, a balancing assembly 140d includes plural balancing members 142d, an adhesive material 144d and plural channels 146d, 148d. The balancing members 142d are separated from each other and arranged into an array. The adhesive material 144d encapsulates the balancing members 142d and is filled into the channels 146d, 148d to fix the balancing assembly 140d onto the clamping member 130. Here, the shape of the balancing members 142d is, for instance, a triangular column and the channels 146d are embodied as plural through holes penetrating the balancing members 142d. When the rotation wheel 100d is viewed from a top perspective, the shape of the through hole is a circular. Besides, the channels 148d of the embodiment are embodied as plural gaps, and the gaps are respectively located between the balancing members 142d.

With the design of the channels 146d, 148d in the balancing assembly 140d, a curing light beam can be directly irradiated to the bottom of the balancing members 142d. In this way, the adhesive material 144d at the bottom of the balancing member 142d can be easily cured by irradiation while increasing the contact area between the adhesive material 144d and the balancing member 142d. Thus, the balancing member 142d is closely attached to the clamping member 130. That is, in the embodiment a greater number of balancing members 142d are arranged in the same area, and through holes (i.e., the channels 146d) and gaps (i.e., the channels 148d) are provided, as light channels, between the respective balancing members 142d, thereby making it easier to irradiate the curing light beam to the bottom of the balancing members 142d. In brief, with the design of the channels 146d, 148d, the contact areas between the adhesive material 144d, the balancing members 142d as well as the clamping member 130 and the adhesion after encapsulation can be increased, thereby strengthening the structural reliability of the rotation wheel 100d of the embodiment.

Figure 6A:
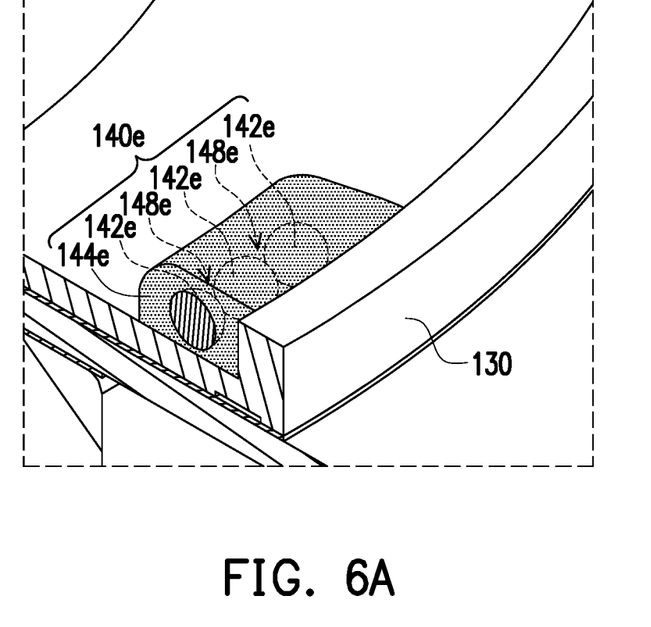
FIG. 6A is a schematic cross-sectional perspective view of a rotation wheel according to another embodiment of the invention.
Figure 6B:
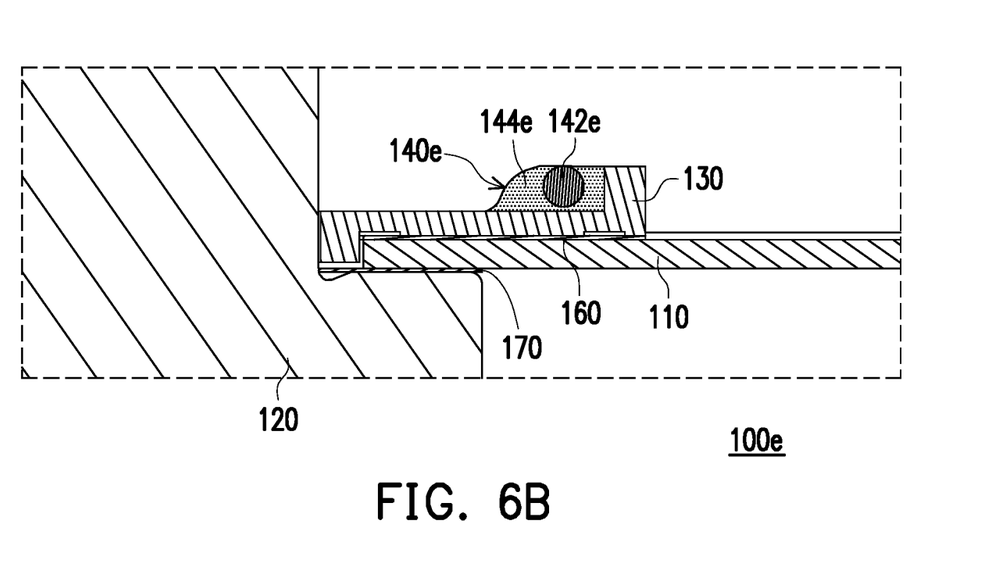
FIG. 6B is a schematic cross-sectional view of the rotation wheel of FIG. 6A.

FIG. 6A is a schematic perspective cross-sectional view of a rotation wheel according to another embodiment of the invention. FIG. 6B is a schematic cross-sectional view of the rotation wheel of FIG. 6A. Referring to FIG. 2B, FIG. 6A and FIG. 6B together, a rotation wheel 100e of the embodiment is similar to the rotation wheel 100a of FIG. 2B, and a main difference lies in: in the embodiment, a balancing assembly 140e includes plural balancing members 142e, an adhesive material 144e and plural channels 148e. The adhesive material 144e encapsulates the balancing members 142e separated from each other and is filled into the channels 148e to fix the balancing assembly 140e onto the clamping member 130. Here, the shape of the balancing member 142e is, for instance, a sphere and the channels 148e are embodied as plural gaps, and the gaps are respectively located between the balancing members 142e.

With the design of the channels 148e in the balancing assembly 140e, a curing light beam can be directly irradiated to the bottom of the balancing members 142e. In this way, the adhesive material 144e at the bottom of the balancing member 142e can be easily cured by irradiation while increasing the contact area between the adhesive material 144e and the balancing member 142e. Thus, the balancing member 142e is closely attached to the clamping member 130. That is, in the embodiment, a greater number of balancing members 142e are arranged in the same area, and the gaps (i.e., the channels 148e) are provided, as light channels, between the respective balancing members 142e, thereby making it easier to irradiate the curing light beam to the bottom of the balancing members 142e. In brief, with the design of the channels 148e, the contact areas between the adhesive material 144e, the balancing members 142e as well as the clamping member 130 and the adhesion after encapsulation can be increased, thereby strengthening the structural reliability of the rotation wheel 100e of the embodiment.

Based on the above, the embodiments of the invention has at least one of the following advantages or effects. In the rotation wheel of the invention, the balancing assembly includes the balancing member, the adhesive material and the channel. The adhesive material encapsulates the balancing member and is filled into the channel to fix the balancing assembly onto the clamping member. With the design of the channel, the contact area between the adhesive material, the balancing member and the clamping member and the adhesion after encapsulation can be increased, thereby strengthening the structural reliability of the rotation wheel of the invention. In addition, the projection apparatus using the rotation wheel of the invention exhibits favorable projection quality and product competitiveness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A rotation wheel, comprising: a substrate, a driving assembly, a clamping member and a balancing assembly; wherein
    the driving assembly is connected with the substrate, and is configured to drive the substrate to rotate around an axis of the driving assembly as a central axis;
    the clamping member is disposed along the axis on the substrate; and
    the balancing assembly comprises at least one balancing member, an adhesive material and at least one channel, wherein
        the adhesive material encapsulates the at least one balancing member and is filled into the at least one channel to fix the balancing assembly onto the clamping member; and
        the at least one channel is a slot penetrating the at least one balancing member or a plurality of through holes penetrating the at least one balancing member and separated from each other.

2. The rotation wheel of claim 1, wherein the at least one balancing member is one balancing member.

3. The rotation wheel of claim 1, wherein the at least one balancing member is connected with a configuration surface of the clamping member by the adhesive material.

4. The rotation wheel of claim 1, wherein a shape of the at least one balancing member comprises a ring-shaped column, a cylindrical column, a sphere, or a polygonal column.

5. The rotation wheel of claim 1, further comprising:
    an optical layer, disposed on the substrate and located on a same side of the substrate with the clamping member.

6. The rotation wheel of claim 1, wherein a shape of the substrate and a shape of the clamping member are a hollow ring respectively, and the substrate and the clamping member are respectively disposed to be coaxial with the driving assembly.

7. A rotation wheel, comprising: a substrate, a driving assembly, a clamping member, and a balancing assembly, wherein
    the driving assembly is connected with the substrate, and is configured to drive the substrate to rotate around an axis of the driving assembly as a central axis;
    the clamping member is disposed along the axis on the substrate; and
    the balancing assembly comprises at least one balancing member, an adhesive material and at least one channel, wherein the adhesive material encapsulates the at least one balancing member and is filled into the at least one channel to fix the balancing assembly onto the clamping member, and a density of the at least one balancing member is greater than 2 g/cm³ and less than 23 g/cm³.

8. The rotation wheel of claim 7, wherein the density of the at least one balancing member is greater than a density of the substrate.

9. The rotation wheel of claim 7, wherein the density of the at least one balancing member is greater than a density of the clamping member.

10. A projection apparatus, comprising: an illumination module, a light valve and a projection lens, wherein the illumination module comprises a light source device and a rotation wheel, the illumination module is adapted to provide an illumination light beam, and the rotation wheel is disposed on a transmission path of an excitation light beam provided by the light source device, and the rotation wheel comprises a substrate, a driving assembly, a clamping member and a balancing assembly; wherein the driving assembly is connected with the substrate, and is configured to drive the substrate to rotate around an axis of the driving assembly as a central axis;

the clamping member is disposed along the axis on the substrate; and the balancing assembly comprises at least one balancing member, an adhesive material and at least one channel, wherein the adhesive material encapsulates the at least one balancing member and is filled into the at least one channel to fix the balancing assembly onto the clamping member, and the at least one channel is a slot penetrating the at least one balancing member or a plurality of through holes penetrating the at least one balancing member and separated from each other;

the light valve is disposed on a transmission path of the illumination light beam from the illumination module, and the light valve is configured to convert the illumination light beam into an image light beam; and the projection lens is disposed on a transmission path of the image light beam, and the projection lens is configured to project the image light beam out the projection apparatus.

11. A rotation wheel, comprising: a substrate, a driving assembly, a clamping member, and a balancing assembly, wherein the driving assembly is connected with the substrate, and is configured to drive the substrate to rotate around an axis of the driving assembly as a central axis;

the clamping member is disposed along the axis on the substrate; and the balancing assembly comprises a plurality of balancing members, an adhesive material and at least one channel, wherein the adhesive material encapsulates the plurality of balancing members and is filled into the at least one channel to fix the balancing assembly onto the clamping member, the at least one channel comprises a plurality of gaps, and the plurality of gaps are respectively located between any adjacent two balancing members of the plurality of balancing members, wherein the at least one channel further comprises a plurality of through holes, and the plurality of through holes penetrate the plurality of balancing members respectively.

12. The rotation wheel of claim 11, wherein the at least one channel further comprises a plurality of through holes, and the plurality of through holes penetrate the plurality of balancing members respectively.

13. The rotation wheel of claim 11, wherein the plurality of balancing members are connected with a configuration surface of the clamping member by the adhesive material.

14. The rotation wheel of claim 11, wherein a shape of at least one of the plurality of balancing members comprises a ring-shaped column, a cylindrical column, a sphere, or a polygonal column.

15. The rotation wheel of claim 11, further comprising:
an optical layer, disposed on the substrate and located on a same side of the substrate with the clamping member.

16. The rotation wheel of claim 11, wherein a shape of the substrate and a shape of the clamping member are a hollow ring respectively, and the substrate and the clamping member are respectively disposed to be coaxial with the driving assembly.

\* \* \* \* \*